United States Patent
Usher, Jr.

(10) Patent No.: US 12,460,348 B2
(45) Date of Patent: *Nov. 4, 2025

(54) POLYESTER COMPOSITION WITH IMPROVED DYEING PROPERTIES

(71) Applicant: Parkdale Incorporated, Gastonia, NC (US)

(72) Inventor: Robert Alton Usher, Jr., Charlotte, NC (US)

(73) Assignee: Parkdale Incorporated, Gastonia, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,772

(22) Filed: Nov. 14, 2018

(65) Prior Publication Data

US 2019/0078256 A1    Mar. 14, 2019

Related U.S. Application Data

(63) Continuation of application No. 15/258,308, filed on Sep. 7, 2016, now Pat. No. 10,174,454.

(Continued)

(51) Int. Cl.
*D06P 3/82* (2006.01)
*C08G 63/672* (2006.01)
(Continued)

(52) U.S. Cl.
CPC .......... *D06P 3/8228* (2013.01); *C08G 63/672* (2013.01); *D01F 2/00* (2013.01);
(Continued)

(58) Field of Classification Search
CPC ....... C08G 63/672; D06P 3/82; D06P 3/8228; D06P 3/8238; D06P 3/8252;
(Continued)

(56) References Cited

U.S. PATENT DOCUMENTS 3,690,942 A    9/1972    Vandermaas
4,115,621 A *  9/1978    Hawkins ................ D06M 7/00
                                            428/395

(Continued)

FOREIGN PATENT DOCUMENTS

EP    0066634    12/1982
EP    0018947    2/1984

(Continued)

OTHER PUBLICATIONS

Textile Effects Novacron LS reactive dyes, Exhaust Dyeing with Low Salt addition, Huntsman, 2007; pp. 31.

(Continued)

*Primary Examiner* — Angela C Brown-Pettigrew
*Assistant Examiner* — Preeti Kumar
(74) *Attorney, Agent, or Firm* — Michael M. McCraw; Moore & Van Allen PLLC

(57) ABSTRACT

A copolymer composition is disclosed with advantages for textile fibers, yarns, blended yarns, fabrics, and garments. The composition includes polyester copolymer, between about 4.5 and 5.5 percent adipic acid based on the amount of copolymer, between about 630 and 770 parts per million (ppm) of pentaerythritol based on the amount of copolymer, and between about 3.4 and 4.2 percent polyethylene glycol based on the amount of copolymer.

16 Claims, 8 Drawing Sheets

Related U.S. Application Data

(60) Provisional application No. 62/324,467, filed on Apr. 19, 2016, provisional application No. 62/217,268, filed on Sep. 11, 2015.

(51) Int. Cl.
*D01F 2/00* (2006.01)
*D01F 6/84* (2006.01)
*D01F 6/86* (2006.01)
*D06P 3/52* (2006.01)
*D06P 3/66* (2006.01)

(52) U.S. Cl.
CPC .............. *D01F 6/84* (2013.01); *D01F 6/86* (2013.01); *D06P 3/8223* (2013.01); *D06P 3/8233* (2013.01); *D06P 3/8238* (2013.01); *D06P 3/8252* (2013.01); *D06P 3/528* (2013.01); *D06P 3/66* (2013.01); *D10B 2201/02* (2013.01); *D10B 2401/14* (2013.01); *D10B 2501/00* (2013.01)

(58) Field of Classification Search
CPC ...... D06P 3/8223; D06P 3/8233; D06P 3/528; D06P 3/66; D01F 2/00; D01F 6/84; D01F 6/86; D10B 2201/02; D10B 2401/14; D10B 2501/00
See application file for complete search history.

(56) References Cited

U.S. PATENT DOCUMENTS

| | | | |
|---|---|---|---|
| 4,690,866 A | 9/1987 | Kumakawa | |
| 5,135,697 A | 8/1992 | Roderiguez | |
| 5,151,494 A | 9/1992 | Munday | |
| 5,272,246 A * | 12/1993 | Roderiguez | C08G 63/20 442/303 |
| 5,464,694 A | 11/1995 | Heinrich | |
| 6,261,686 B1 * | 7/2001 | Schumann | C08G 63/6924 524/81 |
| 6,497,732 B1 * | 12/2002 | Soane | C09B 62/00 8/543 |
| 6,517,933 B1 * | 2/2003 | Soane | B82Y 15/00 428/221 |
| 6,783,853 B2 | 8/2004 | Figuly | |
| 10,174,454 B2 * | 1/2019 | Usher, Jr. | D06P 3/8252 |
| 2002/0019508 A1 * | 2/2002 | Branum | D04H 1/43828 528/272 |
| 2003/0134117 A1 | 7/2003 | Branum | |
| 2004/0143054 A1 | 7/2004 | Maurer | |
| 2004/0195543 A1 | 10/2004 | Masuda | |
| 2007/0055043 A1 * | 3/2007 | Nadkarni | D01F 6/84 528/272 |
| 2017/0073887 A1 | 3/2017 | Usher | |
| 2017/0107662 A1 | 4/2017 | Usher | |
| 2019/0078256 A1 * | 3/2019 | Usher, Jr. | D06P 3/8238 |

FOREIGN PATENT DOCUMENTS

| | | |
|---|---|---|
| EP | 0474418 | 3/1992 |
| EP | 0843030 | 5/1998 |
| GB | 903913 | 8/1962 |
| GB | 1152647 | 5/1969 |
| GB | 1431106 | 4/1976 |
| JP | S43004545 | 2/1968 |
| JP | S46800708 | 3/1971 |
| JP | S55158325 | 12/1980 |
| JP | S58149311 | 9/1983 |
| JP | H02229212 | 9/1990 |
| JP | H04300322 | 10/1992 |
| JP | 3114763 | 9/1994 |
| JP | H1121337 | 1/1999 |
| JP | 2002173824 | 6/2002 |
| JP | 2004533553 | 11/2004 |
| JP | 2006063215 | 3/2006 |
| JP | 20131133570 | 7/2013 |

OTHER PUBLICATIONS

Summary of AATCC test method 61—Test No. 1A or Test No. 2A; ISO Test Method 105-C-06-1A or 2A, CAN/CGSB Test Method 19, Colorfastness to Laundering, Home & Commercial Accelerated (Hand Wash) (Machine Wash), 2013.

Summary of ASTM D3512 Standard Test Method for Pilling Resistance and Other Related Surface Changes of Textile Fabrics: Random Tumble Pilling Tester; 2016; accessed at https://www.astm.org/Standards/D3512.htm on Aug. 29, 2017.

Summary of AATCC Test Method 124-2014 Smoothness Appearance of Fabrics after Repeated Home Laundering; 2014; accessed at https://members.aatcc.org/store/tm124/533/ on Aug. 29, 2017.

ASTM D5225 Standard Test Method for Measuring Solution Viscosity of Polymers with a Differential Viscometer; ASTM International; 2003; pp. 4.

AATCC Test Method 169-2009 Weather Resistance of Textiles: Xenon Lamp Exposure; AATCC Technical Manual/2010; pp. 7.

Summary of ASTM D2616-12 Standard Test Method of Evaluation of Visual Color Differences with a Gray Scale; 2012; accessed at https://www.astm.org/Standards/D2616.htm on Aug. 29, 2017.

ISO 105-A05—Textiles—Tests for Colour Fastness; Indian Standard; ISO; 1996; pp. 1-4.

Summary of ISO 105-E04; Textiles—Tests for colour fastness—Part E04: Colour fastness to perspiration; accessed at: https://www.iso.org/standrd/57973.html on Oct. 6, 2017.

Summary of ISO 105-C06:2010; Textiles—Tests for colour fastness—Part C06: Colour Fastness to domestic and commercial laundering; 2010; accessed at: https://www.iso.org/standard/51276.html on Aug. 29, 2017.

Summary of AATCC Test Method 8 Colorfastness to Crocking; Crockmeter Method; 2013; accessed at https://members.aatcc.org/store/tm8/481/ on Oct. 5, 2017.

Summary of AATCC Test Method 135-2015 Dimensional Changes of Fabrics after Home Laundering; 2015; accessed at: https://members.aatcc.org/store/tm135/543/ on Oct. 5, 2017.

Summary of AATCC Test Method 179-2012 Skewness Change in Fabric and Garment Twist; 2012; accessed at https// members.aatcc.org/store.tm179/577/ on Oct. 5, 2017.

Summary of ISO 105-B02:2014—Textiles—Tests for colour fastness—Part B02: Colour fastness to artificial light: xenon arc fading lamp test; 2014; accessed at https://www.iso.org/standard/65209.html on Oct. 6, 2017.

Summary of ISO 105 E01:2013—Textiles—Tests for colour fastness—Part E01: Colour fastness to water; accessed at: https://www.iso.org/standard/57962.html on Oct. 5, 2017.

Summary of ISO 105-A06:1995—Textiles—Tests for colour fastness—Part A06: Instrumental determination of 1/1 standard depth of colour; accessed at: https://ww.iso.org/standard/3790.html on Oct. 5, 2017.

Ho, et al.; Effects of Spinning Conditions on Properties of Polyester Yarn Prepared using an Ultra-high-speed Melt Spinning Technique Equipped with a Steam Chamber; Bull. Korean Chem. Soc. 2010, vol. 31, No. 11, pp. 3252-3258.

Berkowitz, "Viscosity-molecular weight relationships for poly(ethlene trephthalate) in hexafluoroisopropanol-pentafluorophenol using SEC-LALLS," Journal of Applied Polymer Science, vol. 29, No. 12; Dec. 1, 1984, pp. 4353-4361.

Rushing et al., "Intrinisic viscosity dependence on plymer molecular weight and fluid temperature," Journal of Applied Polymer Science, vol. 89, No. 10, Sep. 6, 2003; pp. 2831-2835.

Definition of "dye"—Tortora, Fairchild's Dictionary of Textiles, 7th Edition, 2009 Fairchild Publications.

Extended Search Report of counterpart Application No. EP16188132.1 mailed Nov. 1, 2016.

(56) References Cited

OTHER PUBLICATIONS

Akra Polyester Material Data Sheet (MSDS), 2009; p. 4.
Office Action issued Dec. 27, 2017 of counterpart Japanese Patent Appication No. 2016-177308.

* cited by examiner

POLYESTER COMPOSITION WITH IMPROVED DYEING PROPERTIES

RELATED APPLICATIONS

This application is a continuation of Ser. No. 15/258,308 filed Sep. 7, 2016 which claims priority to Ser. No. 62/324,467 filed Apr. 19, 2016 and Ser. No. 62/217,268 filed Sep. 11, 2015. This application is related to co-pending Ser. No. 15/258,338 filed Sep. 7, 2016.

BACKGROUND

The present invention relates to polyester copolymer compositions suitable for synthetic filaments and to fibers and fabrics that can be made from such compositions. In particular, the invention relates to compositions that will produce fibers that can be blended and dyed with cotton under conditions that are more typically favorable for cotton than for polyester.

The use of synthetic compositions to produce filaments, fibers, and then fabrics is well established. Accordingly, improvements in such entrenched compositions can be particularly advantageous. Such improvements are, of course, more valuable when they enhance desired characteristics of filaments, fibers, fabrics, and items—very often clothing—made from such compositions.

Working backwards, a garment is typically formed of a fabric that is either woven or knitted from yarns. In turn, yarns are formed from individual fibers joined together, most commonly using well known and well established spinning processes.

Natural fibers—the most common are cotton and wool—have characteristics that produce desired properties in yarns, fabrics, and garments. For example, wool has (among other advantages) excellent thermal properties, and remains insulating when wet. Unless treated properly, however, wool can be abrasive and thus uncomfortable when in contact with skin for extended intervals. Cotton produces fabrics that are comfortable and breathable, but can lose its thermal insulation properties when wet. Further advantages of cotton, wool, and other natural fibers are generally well understood in the art.

In the same manner, synthetic fibers have some properties that are subjectively better then natural fibers, some of which can include (particularly in the case of polyester) strength, durability, and "memory."

Accordingly, one of the goals in producing or designing or developing synthetic compositions for eventual use as fibers, yarns and fabrics is to take advantage of some of the favorable properties of synthetics, while matching as closely as possible—or in some cases improving upon—the desired properties of natural fibers (e.g., the thermal insulation of wool, but less abrasive; the comfort of cotton, but with better thermal properties when wet).

In the clothing industry, the ability to produce garments with desired colors is a fundamental goal. The nature of both natural and synthetic fibers and their underlying chemical compositions requires, however, that color be obtained by some type of dyeing process. Depending upon circumstances, fibers can be dyed as fiber, filament, yarn, fabric, or even as a garment. Furthermore, because in many cases consumers expect to be able to wash and dry garments in machines many times, an associated goal is to obtain garments that can withstand such repeated machine washing and drying while still maintaining most or all of the desired color. Related goals include light fastness (typically with respect to exposure to sunlight) and (using active wear as another example) color stability when exposed to perspiration.

Fundamentally, the relationship between the color of a garment and its lifetime will be based upon the chemical composition of the underlying fibers and the chemical composition of an appropriate dye composition. As is well understood in the art, a dye is technically defined as "a colorant that becomes molecularly dispersed at some point during application to a substrate and also exhibits some degree of permanence." Tortora, FAIRCHILD'S DICTIONARY OF TEXTILES, Seventh Edition, 2009 Fairchild Publications.

Dye is typically categorized as either natural (e.g., from plants) or synthetic (e.g., typically developed from other compositions using principles and techniques of organic chemistry).

The dyeing characteristics of a fiber are based upon the composition from which the fiber is formed. The desired property is referred to as "dyeability," which is defined as the "capacity of fibers to accept dyes." (Tortora, supra).

In the manufacture or garments, it is also common to blend synthetic fibers with natural fibers in proportions that produce a finished garment with desired properties. For a number of reasons, blends of cotton and polyester have long been popular. Based on that, compositions and methods for producing dyed color in cotton-polyester blends has been and remains a desired outcome. The natures of the two different fibers, however, present practical problems. For example, cotton can be conveniently dyed with "reactive dyes" that can be successfully added to a cotton substrate at temperatures of about 150° F.

On the other hand, the properties of polyester (i.e., the polymer formed from the condensation esterification and then polymerization of terephthalic acid and ethylene glycol) required that polyester be dyed with "disperse dyes;" i.e., small particles of colorant suspended in water.

Coloring polyester with disperse dyes tends to require significantly higher temperatures; typically above 250° F. and frequently on the order of 270° F. or higher. In many cases, high pressure (i.e., above atmospheric pressure) is also required to successfully dye polyester, or to reach the temperatures required to dye the polyester.

As further comparative factors, cotton dyeing tends to be driven by the pH of the dye solution or composition (typically in a basic environment); while polyester dyeing tends to be driven by the temperature, and conventionally requires the addition and performance of supplementary chemicals commonly referred to as "carriers" or "leveling agents." From the standpoint of economics, disperse dyes (sometimes referred to as "high energy" dyes because of the conditions required) are more expensive than reactive dyes, and sometimes by as much as a factor of 5-10 times on a comparative basis.

Because of the differences in the dyeing compositions and the dyeing conditions, it is conventional practice to dye cotton and polyester separately.

In some conventional methods, blended cotton-polyester fabric is dyed in two separate steps. In a first step, the fabric is dyed in a slightly acidic bath at a temperature of about 270° F. or higher (e.g., using a disperse dye) in order to get the polyester to accept the dye. The partially dyed fabric is then scoured or rinsed, and thereafter dyed in a cotton-appropriate dye (e.g., a direct or reactive dye) at a basic pH and at a temperature of about 150° F. Because many cotton dyestuffs will degrade at the polyester dying temperatures, the two steps cannot be combined.

As another factor that must be addressed, high dyeing temperatures tend to degrade the elasticity of stretch fibers such as spandex that are often included in cotton-polyester fabrics and garments. Some versions of spandex can withstand high dyeing temperatures (e.g. 270° F.), but are proportionately more expensive than versions that have essentially the same end-use properties, but that tend to degrade when dyed at such higher temperatures.

As yet another factor, perceived color (e.g., of a garment) is a combination of the interaction of light, the material the light illustrates, and the resulting perception of the human eye. In terms of textile dyeing, the color of the dye is based upon the functional groups in the dye molecules. Stated differently, different colors in textiles are a function of dye molecules with different compositions. Not all dye colors (i.e., the underlying molecules) perform, however, in the same manner with either natural or synthetic fibers, yarns, and garments. Thus a fiber, yarn, blend, or fabric may accept certain dye colors relatively straightforwardly while rejecting (to some greater or lesser extent) other dye colors under the same conditions.

Furthermore, additives are often used to control or adjust the properties of a polymer melt, and the features of such additives are likely to change either the dyeing characteristics or the spinning characteristics or both.

As another factor, synthetic fibers—and certainly including polyester—are typically manufactured by polymerizing the starting materials and thereafter extruding a melt of the polymer through small openings in a device referred to as a spinneret; a process referred to as "spinning." Those experienced in synthetic and natural fibers will immediately recognize that the term "spinning" is used to refer to two entirely different processes. In one meaning (and since antiquity) spinning refers to the step of twisting individual fibers together and pulling them into a yarn. In the manufacture of synthetic fibers, the extrusion of filaments from a melt into solidified polymer filaments is also referred to as "spinning." The difference is normally clear in context. Typically, the solidification of the extruded filaments is encouraged or advanced using a quenching step, in which a carefully controlled airflow is directed against the extruded filaments.

The properties required of a composition that can be melt and spun in this fashion, however, may be unrelated to, or disadvantageous in combination with, the properties that produce good dyeing characteristics. Composition characteristics that produce the proper viscosity for spinning may be entirely unrelated, and in some cases directly opposite to, those properties that produced good dyeing characteristics. Thus, designing or adjusting the composition of a polymer, copolymer or copolymer blend to improve the spinning properties may result in less desired or even unacceptable dyeing properties.

For example, in order to "spin" properly, a melted polymer must have a certain fluidity (viscosity) that permits the extrusion to produce coherent liquid filaments (i.e. that won't separate) at the spinneret while avoiding a viscosity that too low ("watery") to control the spinning process for its intended purpose. Because the viscosity of a polymer melt is proportional to temperature, the degree of polymerization, and to other polymer properties, the spinning temperature must be appropriate as well. Stated differently, the melted polymer must be able to perform at the indicated temperature.

In the context of synthetic fibers and their manufacture, the term "melt viscosity" refers to the specific resistance of the melted polymer to deformation or flow under any given conditions. The term "intrinsic viscosity" is used to describe a characteristic that is directly proportional to the average molecular weight of a polymer. Intrinsic viscosity is calculated on the basis of the viscosity of a polymer solution (in a solvent) extrapolated to a zero concentration. Thus, the intrinsic viscosity is a characteristic that will affect the melt viscosity, but the melt viscosity is also related to other factors, particularly including the temperature of a melt.

As yet another factor, because synthetic fibers originate as a filament, they must be cut and textured (not necessarily in that order) to gain other properties that are desirable in a finished yarn, fabric, or garment. In most cases, the texturing step requires that the synthetic filament or fiber be mechanically or thermally formed into a shape other than a straight extruded filament. Accordingly, the need to texturize polyester adds another set of properties that must be accounted for and that may compete against the properties that enhance polymerization, spinning, or dyeing.

Thus, a need exists for polymer compositions that can produce a fiber that can be dyed with cotton in a single step.

SUMMARY

In one aspect the invention is a composition with advantages for textile fibers. In this aspect, the invention is a melt of polyester precursors selected from the group consisting of terephthalic acid, dimethyl terephthalate, and ethylene glycol; adipic acid in an amount sufficient to give filaments and fibers made from the melt a dye receptively similar to cotton at atmospheric pressure; pentaerythritol in an amount sufficient to give pill resistance to yarns blended of cotton with fibers made from the melt; and polyethylene glycol in an amount sufficient to give the melt the elasticity necessary to produce extruded filament from the melt. The melt is maintained at a temperature of between about 285° C. and 295° C., and at an intrinsic viscosity of between about 0.58 and 0.82.

In another aspect, the invention is a copolymer composition with advantages for textile fibers. In this aspect the invention includes polyester copolymer, between about 4.5 and 5.5 percent adipic acid based on the amount of copolymer, between about 630 and 770 parts per million (ppm) of pentaerythritol based on the amount of copolymer, and between about 3.4 and 4.2 percent polyethylene glycol based on the amount of copolymer.

In another aspect, the invention is a method of spinning a polyester copolymer filament. The method includes the steps of polymerizing terephthalic acid, ethylene glycol, between about 4.5 and 5.5 percent adipic acid, between about 630 and 770 ppm pentaerythritol, and between about 3.4 and 4.2 percent polyethylene glycol to a copolymer melt with less than 2 percent DEG, at an intrinsic viscosity of between about 0.58 and 0.82 and at a temperature of between about 285° F. and 295° F., with the proportional amounts being based on the amount of polymerized copolymer, and then spinning the resulting polyester copolymer melt into filament.

In another aspect, the invention is a method of coloring yarn blended from cotton and textured polyester copolymer staple in which the yarn is between about 20 percent and 80 percent by weight cotton. The textured polyester staple has a composition of between about 4.5 and 5.5 percent adipic acid based on the amount of polyester copolymer, between about 630 and 770 parts per million of pentaerythritol based on the amount of polyester copolymer, between about 3.4 and 4.2 percent polyethylene glycol based on the amount of polyester copolymer, and less than 2 percent diethylene glycol based on the amount of polyester copolymer. The dyeing step is carried out at atmospheric pressure and a temperature below 212° F. (100° C.).

In another aspect, the invention is a blended yarn. The yarn contains between about 20 percent and 80 percent by weight cotton and textured polyester copolymer as the remainder. The textured polyester staple has a composition of between about 4.5 and 5.5 percent adipic acid based on the amount of polyester copolymer, between about 630 and 770 parts per million (ppm) of pentaerythritol based on the amount of polyester copolymer, between about 3.4 and 4.2 percent polyethylene glycol based on the amount of polyester copolymer, and less than 2 percent diethylene glycol based on the amount of polyester copolymer.

The foregoing and other objects and advantages of the invention and the manner in which the same are accomplished will become clearer based on the followed detailed description.

DETAILED DESCRIPTION

Figure 1:
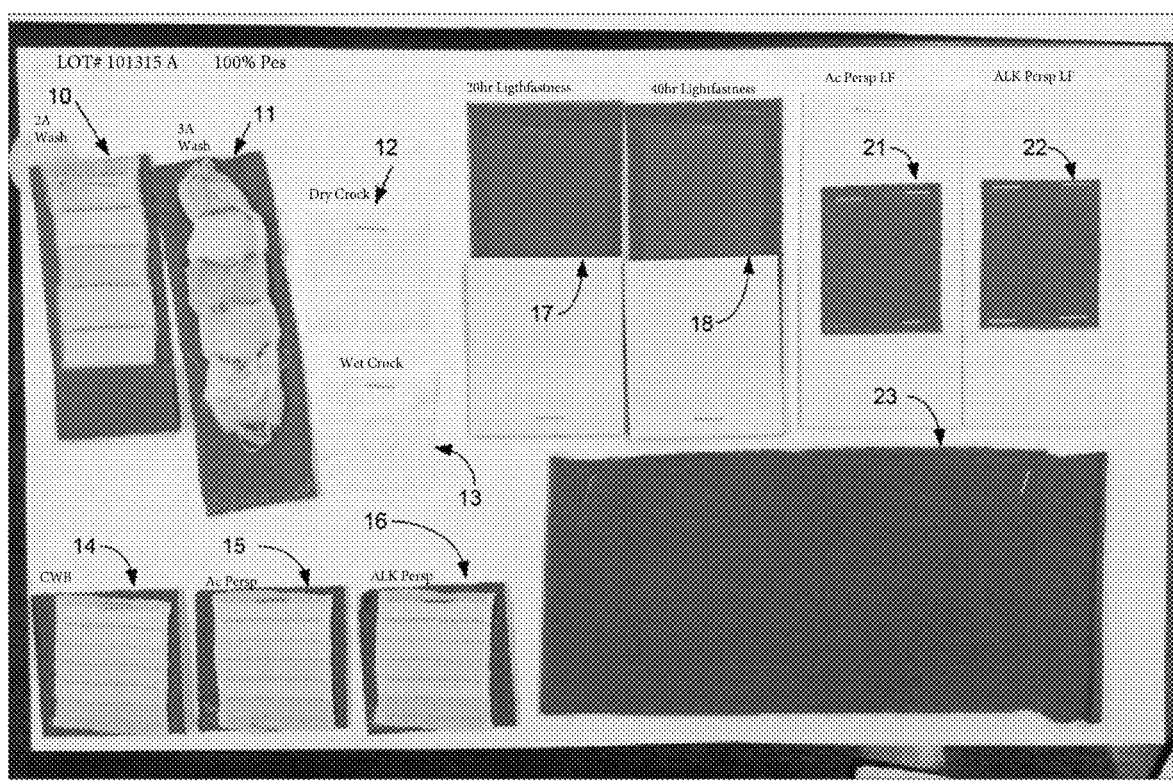
FIGS. 1 through 6 are color photographs of knitted fabrics that are either control fabrics or knitted using the fibers according to the present invention. The photographs correspond to the data presented numerically in Tables 3 and 4.

As set forth herein, the goal of the invention is to produce a fiber that is based upon polyester (polyethylene terephthalate) that can be dyed with cotton in a single step.

As well understood in the art, cotton is typically dyed with reactive or direct dyes at temperatures of about 150° F. (i.e. well below the boiling point of water) and atmospheric pressure. Polyester is typically, and necessarily, dyed with dispersed dyes which require much higher temperatures (above 250° F. in most cases) and thus also may require pressurized equipment (above atmospheric pressure conditions) in order for the dye dispersion to penetrate the polyester. Cotton dying tends to be sensitive to pH, while polyester typically requires additives referred to as carriers or leveling agents (such as fatty acid derivatives) which function to help the dye migrate throughout the substrate material.

In the textile art, terms such as "texturing" and "crimping," are used both broadly and specifically. In the broadest sense, texturing and crimping are used as synonyms to refer to steps in which synthetic filament, staple fiber, or yarn is mechanically treated, thermally treated, or both, to have a greater volume then the untreated filament, staple, or yarn. In a narrower sense, the term crimping is used to describe the production of a two dimensional sawtooth orientation in a filament, fiber or yarn, while the term texturing is used to refer to treatments that produce looping and curling. The meaning is generally clear in context. In the specification and claims, the word "texture" is used in a broad sense to include all possibilities for producing the desired effect in a filament, staple fiber, or yarn.

Commonly assigned provisional application Ser. No. 61/970,569 filed Mar. 26, 2014 describes compositions that include an increased amount (compared to conventional formulations) of adipic acid and diethylene glycol ("DEG") in order to produce a polyester that can be colored with reactive dyes. In further work with the composition, however, it has been discovered that although the '569 composition can accept many colors, it will not accept certain colors, an example of which is one of the NOVACRON® purple dyes from Huntsman Textile Effects (Charlotte, NC; Dalton, GA; Woodlands, TX). Accordingly, and without being limited by any particular theory, a series of comparative tests were carried out to eliminate or moderate components in the types of formulas set forth in No. 61/970,569. On an empirical basis, these tests indicated that the higher amounts of diethylene glycol caused the failure to uptake purple dye in acceptable amounts.

Thus, according to the invention, it has been unexpectedly determined that the presence of diethylene glycol in percentages above about 2% lead to problems dyeing cotton polyester blends with certain dye colors under cotton-favorable conditions.

Based on additional trial compositions and then dyeing and color fastness testing, the invention provides a polyester copolymer that will dye with cotton with much better results over a wider range of colors than No. 61970569 or other attempts. The improved copolymer can be produced by incorporating adipic acid in an amount of between about 4.5 and 5.5%; pentaerythritol in an amount of between about 630 and 770 ppm; between about 3.4 and 4.2% of polyethylene glycol; and while maintaining the amount of diethylene glycol, (a constant byproduct of the esterification of terephthalic acid and ethylene glycol) at less than 2%. These respective amounts are all based on their proportions in the finished copolymer.

In the most helpful composition to date, the adipic acid is present at about 5%, the pentaerythritol at about 700 ppm, and the polyethylene glycol at about 3.8%.

The high level (relativity) of pentaerythritol increases the reactivity of the polymerization reaction. Thus, the conventional expectation is that a lower temperature melt is required to moderate this reactivity. In the invention, however, the pentaerythritol and the increased reactivity are allowed to increase the intrinsic viscosity of the polymer and the overall viscosity of the melt. Conventionally the intrinsic viscosity of polyester used for the filament and then staple fiber is kept at about 0.52-0.65. A less viscous melt tends to be too "watery" and an overly viscous melt tends to separate during extrusion from the spinneret (spinning).

In the invention, the intrinsic viscosity is allowed to significantly increase, and in particular to reach between about 0.58 and 0.82, with 0.75 being exemplary. Given that conventional copolymers tend to run at lower intrinsic viscosities, the higher intrinsic viscosity of the invention is counterintuitive.

Conventionally, in order to get a lower intrinsic viscosity polymer to spin and quench properly, the spinning temperature is reduced. In contrast to this, the composition of the invention is allowed to spin at temperatures that are more conventional for polyester made from monomer (for example 280°-290° C. in the high polymerizer).

Thus, although the spinning temperature for a copolymer with 4.5 to 5.5 percent of polyethylene glycol would conventionally be lowered to about 280° C., in the invention the spinning is carried out at the same temperature as conventional polyester monomer; e.g., about 285-290° C.

The added pentaerythritol reduces the tenacity of the resulting filament, but in the invention this characteristic advantageous because it tends to reduce pilling when staple made from the filament is blended with cotton.

As known to those familiar with textiles in general and polyester fibers and blends of polyester and cotton in particular, the term "pilling" is used to describe small undesired entanglements of fibers ("pills") that can result when the surface of a fabric is abraded (including normal wear and tear). In cotton-polyester blends, pilling can be more noticeable because the strength of the polyester tends to preclude pills formed from the polyester fibers from breaking off of the fabric as easily as do pills of cotton fibers. Pilling can be tested using ASTM D3512 ("Standard Test Method for Pilling Resistance and Other Related Surface Changes of Textile Fabrics") e.g., random tumble testing; or AATCC Test Method 124-2014 ("Smoothness Appearance of Fabrics after Repeated Home Laundering").

Table 1 illustrates a number of comparative compositions developed for the purpose of identifying the most advantageous compositions for the invention. Table 1 includes a series of eight (8) experiments each of which was designed to produce a 1000 gram (1 Kg) batch of polymer. These batches were produced in a one kilogram NCCATT reactor, following which the filament was spun on a laboratory scale extrusion machine. These starting materials were polymerized at a temperature of 290° C. and until reaching a target intrinsic viscosity of 0.620.

As Table 1 indicates, the starting materials included appropriate catalysts and at least one optical brightener (fluorescent whitening agent). Optical brighteners are generally well understood in the art, and function by absorbing UV radiation (e.g., in the region from 360 to 380 nanometers) and re-emitting longer-wavelength, visible blue-violet light in the visible portion of the spectrum. Such compositions can be selected by the skilled person without undue experimentation, and provided that the selected brightener does not undesirably affect the desired properties of the finished copolymer, fiber, or fabrics. The starting materials also included small amounts of antimony oxide (0.35 g), 0.02 g of 10% phosphoric acid, and tetramethyl ammonium hydroxide (0.160 g of a 5% solution in water).

Fabrics formed from the compositions in Table 1 can be dyed in the following generally conventional manner. The fabric to be dyed is placed in an aqueous solution that optionally includes desired auxiliaries (e.g., leveling agents and salt) and allowed to equilibrate as the temperature is raised from room temperature to the dyeing temperature (e.g. above about 150° F., but below boiling) over the course of about 25 minutes. The temperature is then maintained generally constant while the dye is added (in a liquor ratio of about 10:1) over a period of about 15 minutes, after which the temperature is raised to about 195° F. for about 30 minutes to allow the dye to migrate. The temperature is then lowered over an interval of about 10 minutes to about 158° F. and maintained there for about 35 minutes to allow the dye to fix.

The dyed fabric is then rinsed for about 10 minutes at about 122° F., and potentially rinsed more than once depending upon the overall circumstances. The fabric is then neutralized for about 10 minutes at about 160° F., typically with weak acetic acid (e.g., no more than 1%). The fabric can then be soaped for 10 minutes for one or two cycles at about 200° F., depending upon the hardness of the water and the shade of the intended color.

The fabric is then rinsed with hot water (about 160° F.) and then cold water, each for about 10 minutes. If desired or necessary (e.g., depending upon the dye shade or other factors) the fabric can be treated with fixatives (e.g., polymeric quaternary ammonium compounds are exemplary) and softeners.

Of these compositions, PD11 would accept a high energy dye at 260-270° F., but would not accept a low energy dye at 205° F. PD12 and PD13, however, would accept a low energy dye throughout the fiber. The capacity to dye properly with a low energy dye provides significant cost savings because high-energy dyes are proportionately more expensive (sometimes by a factor of 10) than reactive dyes.

Although the invention is not limited by any particular theory, it can be hypothesized that the adipic acid provides the dye receptivity, the pentaerythritol provides the pill resistance, and the polyethylene glycol provides the elasticity to spin the melt into filament.

Accordingly, it will be understood that in one aspect the invention is the composition: polyester, adipic acid, pentaerythritol, polyethylene glycol, or low amounts of diethylene glycol. In turn, the composition can be understood as a polymerized melt, as a polyester copolymer filament made from the melt, or as a textured filament made from the composition.

TABLE 1

Production of 1000 gram batches of copolymer

|  | Units | PD11 | PD12 | PD13 | PD14 | PD15 | PD16 | PD17 | PD18 |
|---|---|---|---|---|---|---|---|---|---|
| TA | Grams | 861 | 828 | 828 | 828 | 828 | 828 | 828 | 828 |
| EG | ml | 406 | 391 | 391 | 391 | 391 | 391 | 391 | 391 |
| $Sb_2O_3$ | Grams | 0.3 | 0.3 | 0.3 | 0.3 | 0.3 | 0.3 | 0.3 | 0.3 |
| Cobalt Acetate | Grams | 0.09 | 0.09 | 0.09 | 0.09 | 0.09 | 0.09 | 0.09 | 0.09 |
| $TiO_2$ | Grams | 2.0 | 2.0 | 2.0 | 2.0 | 2.0 | 2.0 | 2.0 | 2.0 |
| OB | Grams | 0.2 | 0.2 | 0.2 | 0.2 | 0.2 | 0.2 | 0.2 | 0.2 |
| PEG (MW = 400) Note 1 | ml | 0.0 | 38.0 | 38.0 | 38.0 | 30.0 | 30.0 | 22.0 | 22.0 |
| DEG | ml | 50.0 | 0.0 | 0.0 | 0.0 | 0.0 | 0.0 | 0.0 | 0.0 |
| Adipic Acid | Grams | 50.0 | 50.0 | 50.0 | 50.0 | 50.0 | 30.0 | 50.0 | 50.0 |
| Pentaerythritol | Grams | 0.9 | 1.0 | 0.7 | 0.5 | 0.7 | 0.7 | 0.7 | 0.9 |
| Total of Raw Materials | Grams | 1242.5 | 1240.6 | 1240.3 | 1240.1 | 1242.3 | 1222.3 | 1239.3 | 1239.4 |

TA = terephthalic acid;
EG = ethylene glycol;
DEG = diethylene glycol;
PEG = polyethylene glycol;
OB = optical brightener
Note 1:
add after esterification & before polymerization Texturing is well understood in the art and will not be otherwise described in detail, other than to point out that to date, the composition of the invention produces filament that can be textured using conventional steps (e.g., heat setting while in a twisted position).

The composition aspects of the invention also include the manufacture of staple fibers cut from the filament (typically from a textured filament), yarns, particularly blends of cotton and the polyester copolymer of the invention, dyed yarns, fabrics, dyed fabrics, and garments.

It will further be understood that the dying step can be carried out on the blended yarn, on a fabric formed from the blended yard, or even on a garment formed from the blended yarn.

In the method context, the invention includes the steps of polymerizing a charge of terephthalic acid, ethylene glycol, adipic acid in an amount of between about 4.5 and 5%, pentaerythritol in an amount of between about 630 and 770 ppm, polyethylene glycol in an amount of between about 3.4 and 4.2%, and less than 2% diethylene glycol. These amounts are expressed as the weight percentage of the component as compared to the total weight of the finished copolymer.

The charge is run at (or until it reaches) an intrinsic viscosity of between about 0.68 and 0.82 and at a temperature of between about 285 and 295° C. The melt is spun into filament in an otherwise conventional process.

The filament produced by the method can be textured and cut into staple fiber, spun into a blended yarn with cotton (typically with cotton in the range of 5-95% by weight) and dyed as yarn. Alternatively, the blended yarn can be woven or knitted into fabric and then dyed and then formed into a garment. In some circumstances, the dyeing step will be carried out on the garment, but dyeing the yarn is probably most common.

Those skilled in the art will also appreciate, however, that the filament can be used as a yarn ("filament yarn"); i.e., without being cut into staple or without being blended with another fiber (e.g., cotton). Such filament yarns are particularly advantageous in the active wear industry. In particular, filament yarn according to the invention provides the opportunity to use spandex that can be dyed at the inventive dyeing temperatures (about 205° F.) while maintaining all of the desired spandex properties. As set forth in the background, variations of spandex that can be dyed at high temperature are available, but at higher cost, and without any corresponding stretch or recovery advantages for active wear purposes.

Because poly-cotton blends are manufactured, sold, and used in a variety of proportions, a potentially wide range (5-95% cotton) is expressed herein. Nevertheless, it will be understood that although the invention certainly offers advantages for high cotton blends, the invention provide particular advantages for poly-cotton blends with a larger proportion (50% or more) of polyester.

As noted previously, with respect to the composition, in the method steps, the best results to date have been obtained with about 5% adipic acid, about 700 ppm pentaerythritol and about 3.8% polyethylene glycol, all based on the total weight of the copolymer composition.

In another aspect, the invention can be considered as the method of dying a blended yard formed from cotton and textured polyester staple that starts with the composition described herein. Thus, the dyeing step is carried out on a yarn that includes between about 5 and 95 percent by weight cotton, along with the polyester that includes the amounts of adipic acid, pentaerythritol, polyethylene glycol, and diethylene glycol recited with respect to the composition and the method of making the filament.

In another aspect, the invention is the blended yarn itself containing about 5-95% by weight cotton, with the textured polyester as the remainder. The textured polyester has the composition described with respect to the other embodiments. For the sake of completeness these are about 4.5-5.5% adipic acid (5% exemplary), between 630 and 770 ppm of pentaerythritol (700 ppm exemplary), between about 3.4 and 4.2% polyethylene glycol (3.8% exemplary) and less than 2% of the diethylene glycol byproduct. Again, these amounts are based on the weight of the finished copolymer.

As with the other embodiments, the yarn can be dyed, and formed into fabric and garments with the dyeing being carried out on the blend as opposed to the conventional steps of dyeing cotton separately from polyester.

Thus, using the invention, a blended fabric can be successfully dyed using a single dye. Alternatively, if two dyes are preferred, the invention allows both dyestuffs to be maintained in a single bath, thus eliminating the conventional rinsing or scouring step between a disperse dyeing step for the polyester and a direct dyeing step for the cotton. In turn, the invention provides the advantages of less water used and less effluent produced.

On a production or continuous scale, the invention is expected to be formed and used in steps with which the skilled person is quite familiar. Thus, as a predictive example, the terephthalic acid and ethylene glycol are mixed into a paste (or slurry) at a mole ratio of between about 1:1 and 1.2:1 (TA to EG). The paste is then transferred to a primary esterifier ("PE") under above atmospheric pressure and temperatures above 250° C. (typically 260-280° C.). The composition forms the esterified monomer (usually representing about 90 percent esterification). This product is then transferred to a secondary esterifier, at which point the pentaerythritol and adipic acid can be added. Pressures in the secondary esterifier are lower than the primary esterifier, but temperatures are slightly higher; e.g., 270-275° C., and esterification reaches (for example) about 94%.

The esterified composition is then transferred to the low polymerizer, and if desired the pentaerythritol and adipic acid alternately can be added between the secondary esterifier and the low polymerizer. The low polymerizer operates at a temperature of about 275-280° C., and under a vacuum to remove the water vapor (the polymerization is a condensation reaction) and the monomers reach a degree of polymerization of about 75-100. The composition is then transferred to a high polymerizer where polymerization reaches much higher numbers, typically on the order of 20,000 units.

The high polymerizer typically runs at temperatures of about 270°-310° C. for standard PET polymers with 285°-290° C. being particularly representative. Conventional copolymers that contain polyethylene glycol normally would be run at temperatures lower in this range; e.g., about 280° C. In the invention, however, the temperature can be maintained higher (e.g., 285°-290° C.) within the standard range but the intrinsic viscosity is allowed to reach between about 0.58 and 0.82, with about 0.75 being favored in many circumstances.

Intrinsic viscosity is typically measured in a capillary viscometer using a sample of the polymer dissolved in an appropriate solvent. As an alternative, instruments are available that can measure the intrinsic viscosity directly and without the step of dissolving the polymer in a solvent. The intrinsic viscosities described herein can be measured or confirmed using, for example ASTM D5225 ("Standard Test Method for Measuring Solution Viscosity of Polymers with a Differential Viscometer") or any test or instrument that gives the same results within an acceptable tolerance or margin of error.

With respect to the invention (and in many cases in general) color fastness represents the resistance of a dyed color to fading or bleeding under various types of influences on the yarn, fabric, or garment. Exposure to water, light, rubbing, washing, and perspiration are typical. Color fastness testing seeks to identify the properties of the material in a manner that is helpful and reproducible.

In a typical test, (AATCC Test Method 61-2013; Colorfastness to Laundering: Accelerated) the fabric color loss and surface changes resulting from detergent solution and abrasive action of five typical hand or home launderings, with or without chlorine, are roughly approximated by one 45 minute test. Samples are exposed to conditions of temperature, detergent solution, bleaching and abrasive action that are expected to produce a color change representative of five hand or home launderings. Standard tests have also been developed by the Society of Dyers and Colorists (SDC; www.sdc.org.uk; accessed Jul. 24, 2015) and the International Organization for Standardization (ISO; www.iso.org; accessed Jul. 24, 2015).

Light fastness (i.e., color fastness under exposure to light) can also be carried out using a high energy xenon fadometers under defined conditions of radiation intensity cycle time (light and dark) and temperature. AATCC Test Method 169-2009, "Weather Resistance of Textiles: Xenon Lamp Exposure," is an appropriate test.

The resulting color differences can be evaluated using standardized gray scale and gray scale testing methods (e.g., ASTM D2616-12; "Standard Test Method for Evaluation of Visual Color Difference With a Gray Scale").

TABLE 2

PD 13 Pill Testing Nov. 30, 2015

| RTP Test at FRC | | 30 min | 60 min |
|---|---|---|---|
| control 40A | 20/1 50/50 KPOE | 222 | 111 |
| PD 13 | 20/1 50/50 KPOE | 333 | 333 |
| control 40A | 20/1 100% OE | 333 | 222 |
| PD 13 | 20/1 100% OE | 333 | 333 |

| 3HL Test at Delta | | | 3HL |
|---|---|---|---|
| control 40A | 20/1 50/50 KPOE | | 3.5 |
| PD 13 | 20/1 50/50 KPOE | | 3.0 |
| control 40A | 20/1 100% OE | | 2.5 |
| PD 13 | 20/1 100% OE | | 2.5 |

Table 2 gives the results of random tumble pilling ("RTP") and home laundering ("HL") tests for both control fabrics and fabrics made from the present invention. As indicated in Table 2, the PD 13 formulation from Table 1 was used as the synthetic component representative of the invention. Testing was carried out using ASTM RTP and ASTM D3512 HL (http://www.astm.org/Standards/D3512.htm; accessed Mar. 3, 2016). The tests are available on a subscription basis, but generally consist of a standardized rubbing action applied between a sample fabric and a standard fabric. A particular number of rubs are carried out, following which the samples are examined to determine the number of pills created. The fabrics are placed on rectangular blocks to carry out the rubbing motion.

In Table 2, 20/1 is the English cotton count ("cotton yarn count system," Totora, supra). Some of the fabrics were 50/50 blends of carded cotton and synthetic staple fibers, open end spun, with the synthetic being either the invention (PD 13) or a Dupont AKRA control (DuPont-Akra Polyester, LLC, Charlotte, NC 28210, USA). Other fabrics were formed from either 100% staple according to the invention or (for control) 100% of the Dupont AKRA polyester. According to a material safety data sheet from DuPont (MSDS No. DU005415), the composition is polyethylene terephthalate (Charlie Alpha Sierra number 25038-59-9) which may include a spin finish of between about 0.2 and 3% of lubricant, and less than 5% of titanium dioxide.

The third and fourth columns represent the timing of the test before visual inspection, along with the rating of the fabric each time, with higher numbers being better in the industry.

The home laundering testing indicated that the control and the invention would be judged equivalent from a visual standpoint, or with the control being slightly better in one case. Nevertheless, and although admittedly a subjective determination, the invention is commercially equivalent to the control for all practical purposes and provides the other advantages described herein.

The blended fabrics in FIGS. 3-6 were dyed using a one-bath-two-step dyeing process that significantly saves both resources and energy. In such a dying process, water and disperse dye (for the polyester) and reactive dye (for the cotton) are all added together to form the dye solution. In the first step, a weak acid (typically acetic) is added to bring the pH to between about 5.5 and 6.5. The mixture is then heated to a temperature of about 205° F.; i.e., a temperature at which the inventive polyester will dye, but standard polyester will not.

In a second step in the same bath—which is not possible with standard polyester—salt and caustic (i.e., a base, typically sodium hydroxide, NaOH) are added to the same bath to activate the reactive cotton dye and bring the pH to the basic side (e.g. about 8).

This one bath two-step process avoids of the need to empty the dye vessel ("pot") after the polyester dying step and to refill it for the cotton dying step. At a minimum this provides a significant time savings which becomes cumulatively advantageous for repeated dyeing steps. Secondly, because the temperature of the bath can be the same for both the cotton and polyester dyeing steps, less heating is required, as is the time required for re-heating. The result is a fully dyed blended fabric from the single dye bath.

TABLE 3

140575 Internal-Parkdale Light Fastness 11-12-15.txt
Method: Change of shade (ISO 105-A05)
Task Id (Standard): Internal-Parkdale 2015
Task Id (Samples): Internal-Parkdale 2015

| Sample: | dEF | Rating |
|---|---|---|
| Standard: 140575 # 101315A ctrl | | |
| 140575 #101315A 20 hrs | 2.79 | 3-4 |
| 140575 #101315A 40 hrs | 4.28 | 2-3 |
| 140575 #101315A AcidPersp/20 hr | 2.84 | 3-4 |
| 140575 #101315A AlkPersp/20 hr | 2.68 | 3-4 |
| Standard: 140575 # 101315B ctrl | | |
| 140575 #101315B 20 hrs | 5.58 | 2-3 |
| 140575 #101315B 40 hrs | 8.65 | 1-2 |
| 140575 #101315B AcidPersp/20 hr | 4.87 | 2-3 |
| 140575 #101315B AlkPersp/20 hr | 5.18 | 2-3 |

TABLE 3-continued

140575 Internal-Parkdale Light Fastness 11-12-15.txt
Method: Change of shade (ISO 105-A05)
Task Id (Standard): Internal-Parkdale 2015
Task Id (Samples): Internal-Parkdale 2015

| Sample: | dEF | Rating |
|---|---|---|
| Standard: 140575 # 101415 ctrl | | |
| 140575 #101415 20 hr | 3.32 | 3 |
| 140575 #101415 40 hr | 5.81 | 2 |
| 140575 #101415 AcidPersp/20 hr | 5.74 | 2-3 |
| 140575 #101415 AlkPersp/20 hr | 4.29 | 2-3 |
| Standard: 140575 # 101515 ctrl | | |
| 140575 #101515 20 hrs | 3.70 | 3 |
| 140575 #101515 40 hrs | 6.07 | 2 |
| 140575 #101515 AcidPersp/20 hrs | 6.14 | 2 |
| 140575 #101515 AlkPersp/20 hrs | 4.48 | 2-3 |
| Standard: 140575 # 101615 ctrl | | |
| 140575 #101615 20 hrs | 4.91 | 2-3 |
| 140575 #101615 40 hrs | 8.24 | 1-2 |
| 140575 #101615 AcidPersp/20 hrs | 5.17 | 2-3 |
| 140575 #101615 AlkPersp/20 hrs | 5.53 | 2-3 |
| Standard: 140575 # 102215 ctrl | | |
| 140575 #102215 20 hrs | 3.87 | 3 |
| 140575 #102215 40 hrs | 6.88 | 2 |
| 140575 #102215 AcidPersp/20 hrs | 6.17 | 2 |
| 140575 #102215 AlkPersp/20 hrs | 5.03 | 2-3 |

Figure 2:
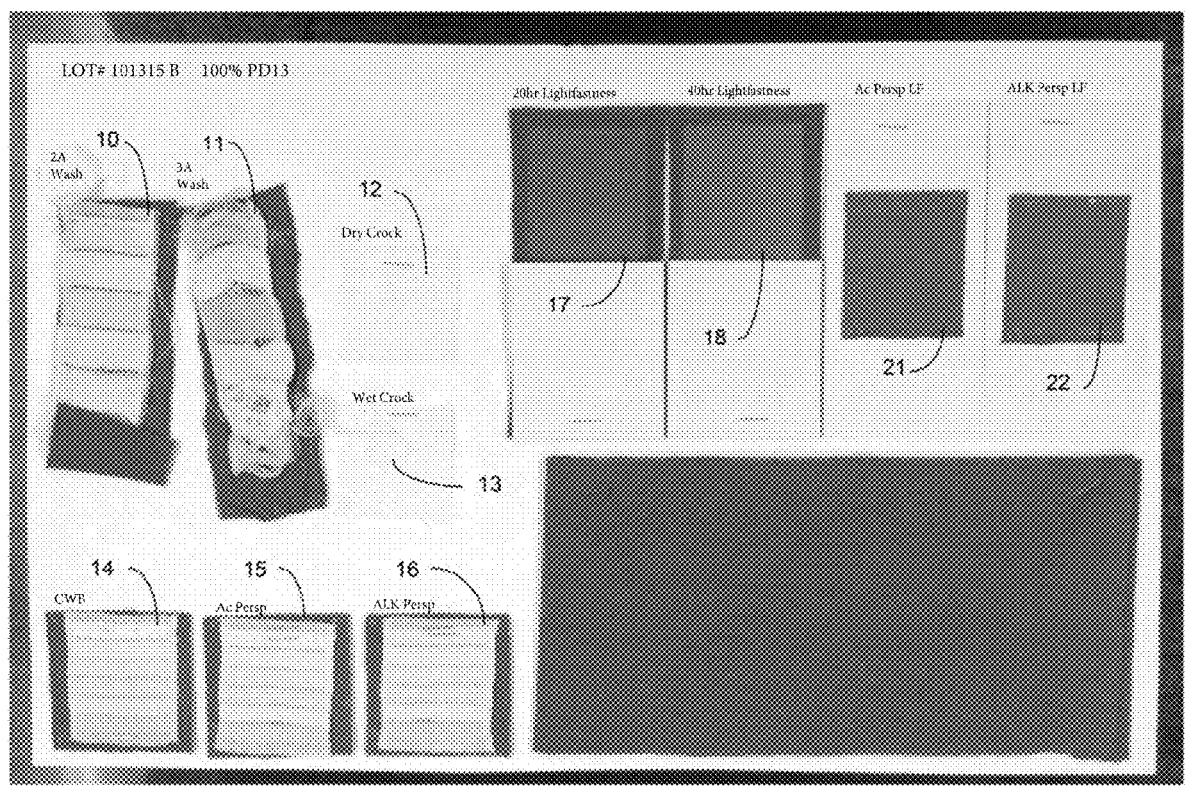
Figure 3:
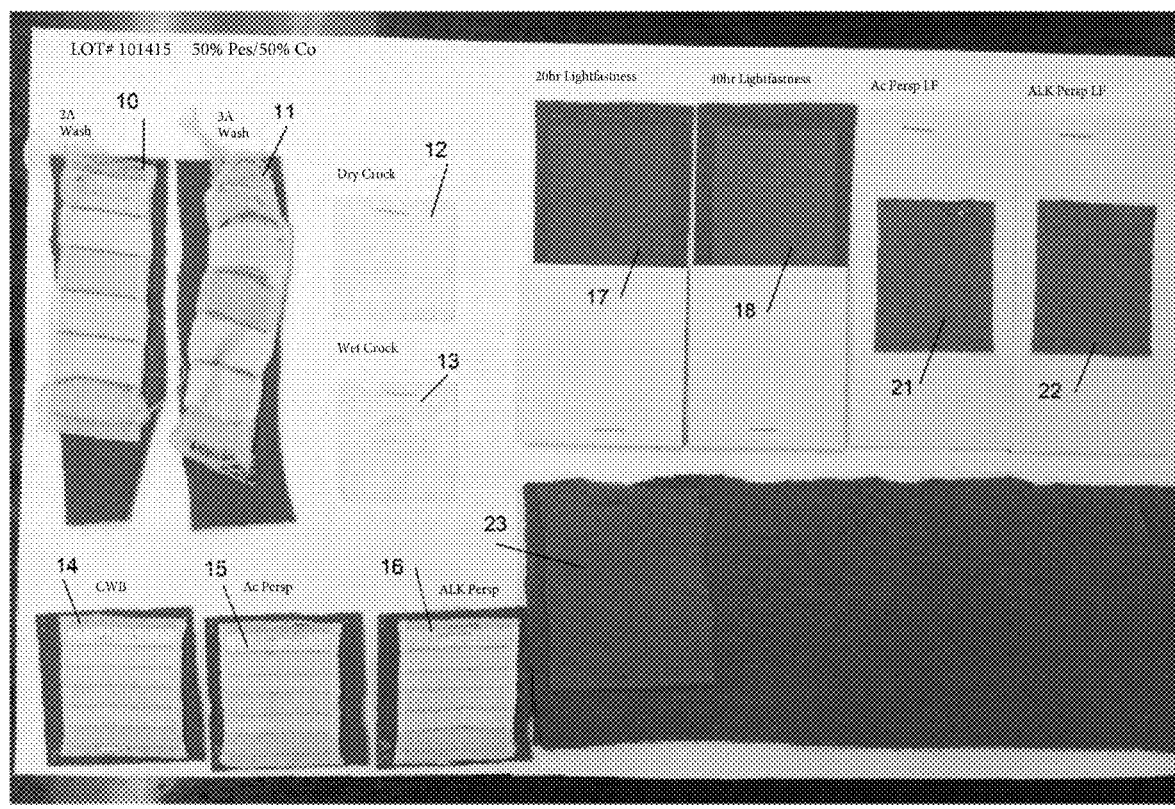
Figure 4:
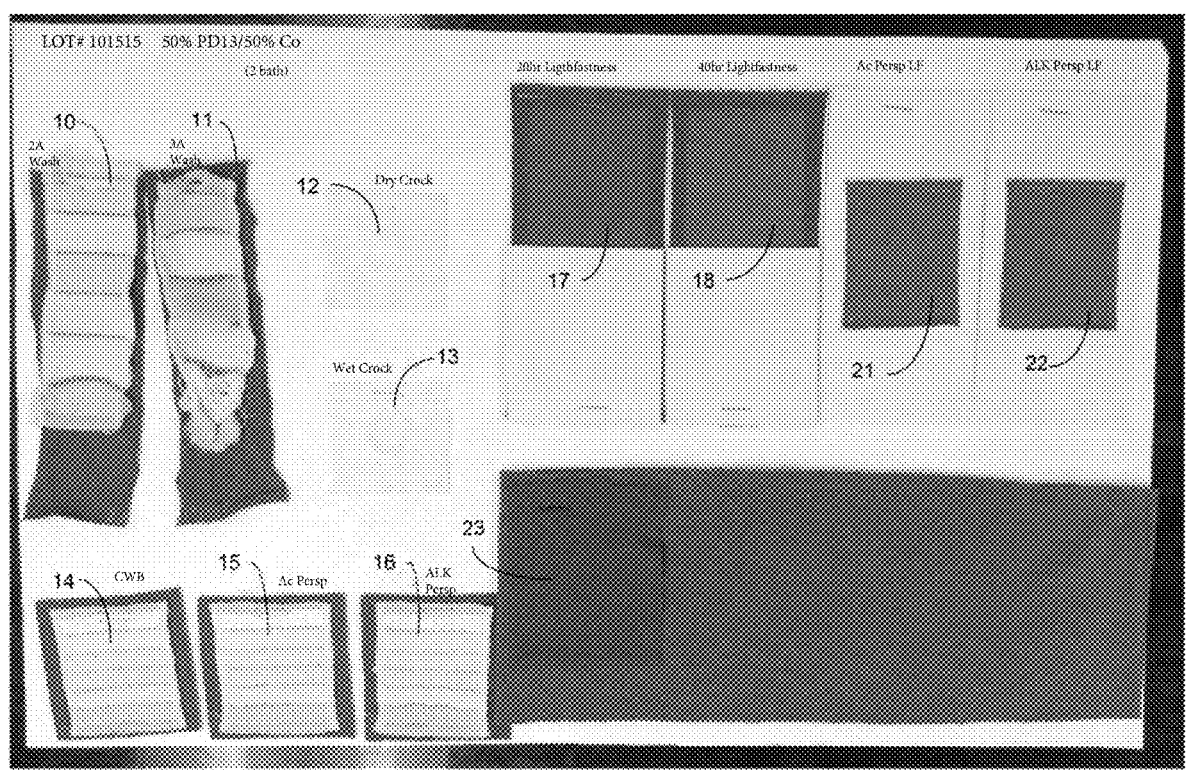
Figure 5:
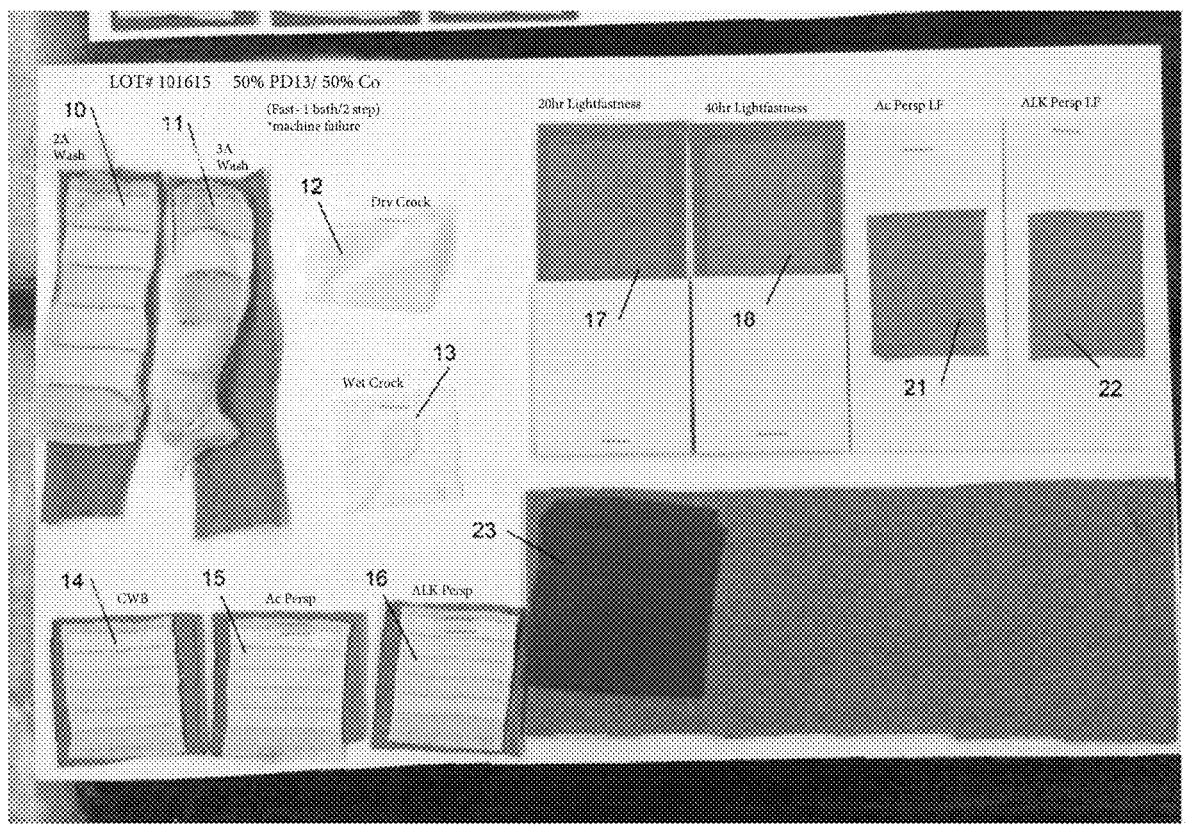
Figure 6:
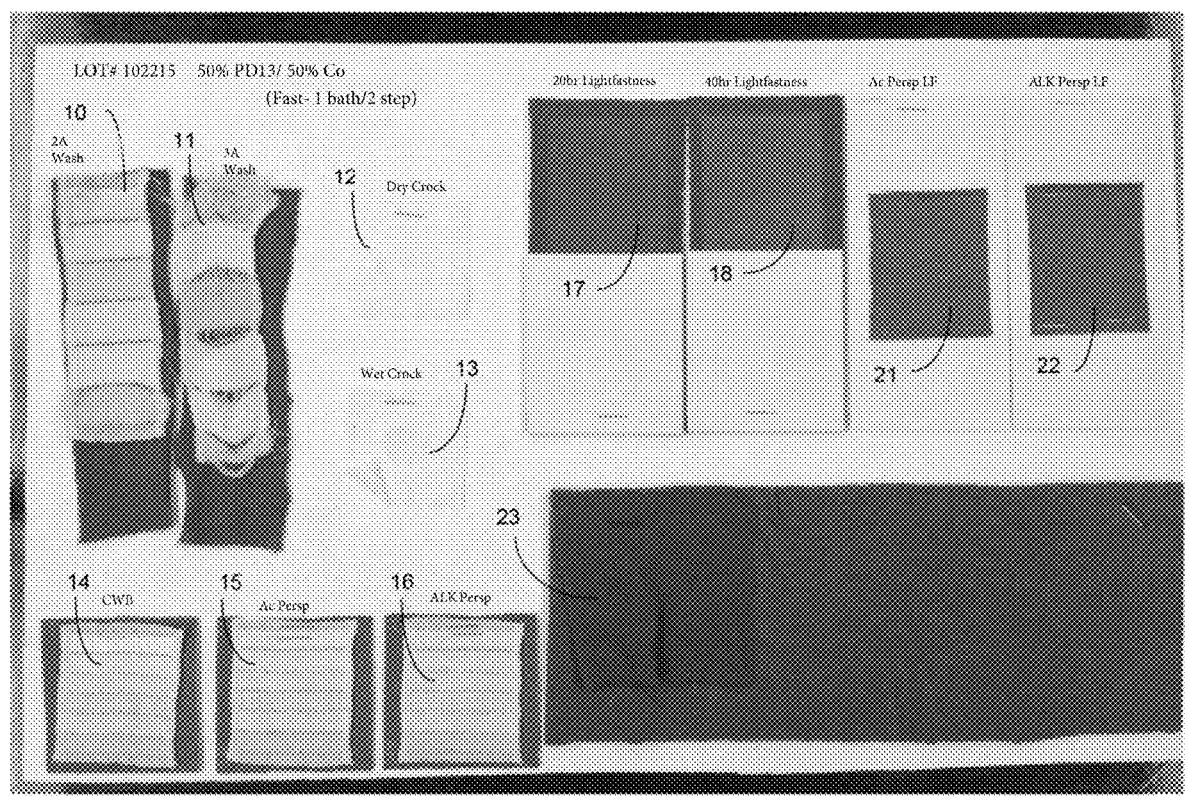
Figure 7:
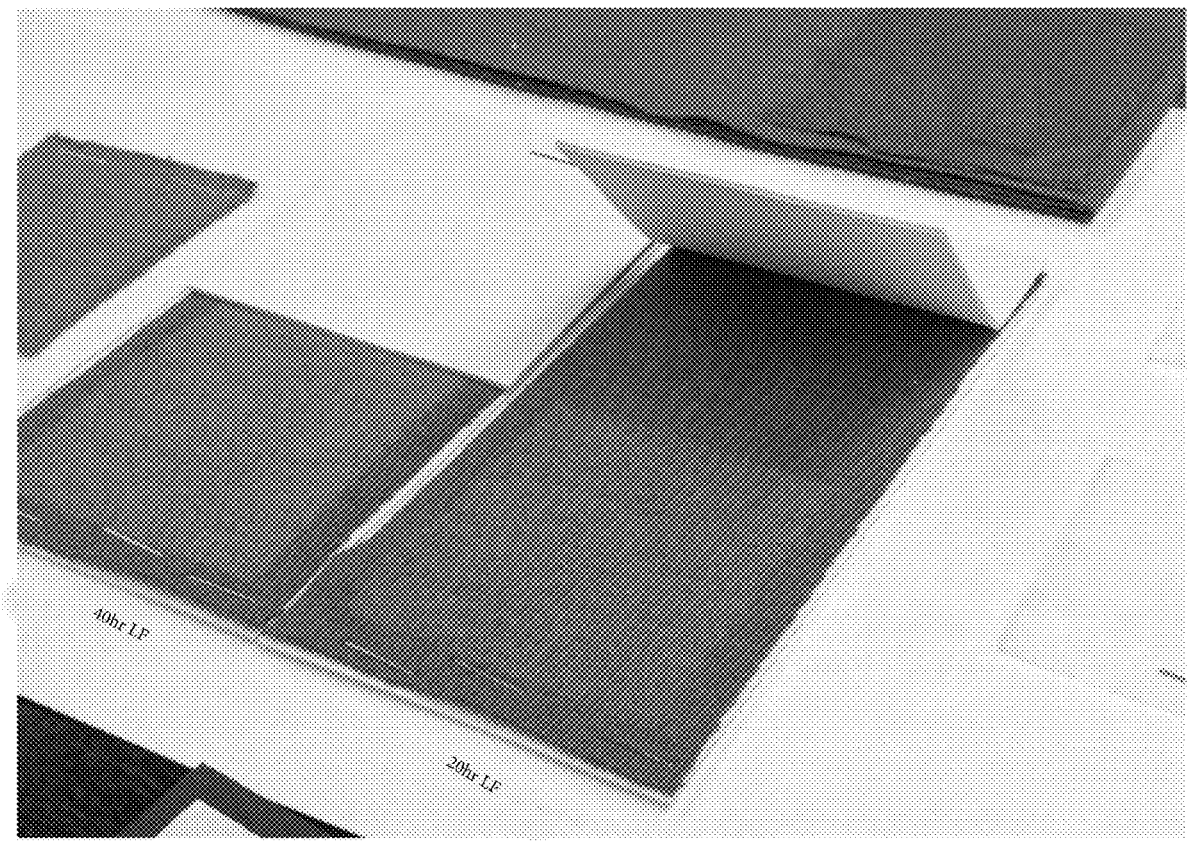
FIG. 7 is an enlarged isolated portion of FIG. 6 showing the difference between a portion of the fabric exposed to light and a portion shaded from light.

Tables 3 and 4 are best interpreted as follows. The sample fabrics in the tables correspond to a lot number in the upper left-hand corner of each of FIGS. 1-6 (e.g., "101315A" for FIG. 1). As a key:

| FIG. 1 | 101315A |
| FIG. 2 | 101315B |
| FIG. 3 | 101415 |
| FIG. 4 | 101515 |
| FIG. 5 | 101615 |
| FIG. 6 | 102215 |

To help clarify the photographs, in each of FIGS. 1 to 6 the following reference numerals correspond to the following results: 10—2A wash; 11—3A wash; 12—dry crock; 13—wet crock; 14—cold water bleed; 15—acid perspiration; 16 alkaline perspiration; 17-20 hour lightfastness; 18-40 hour lightfastness; 21 acid perspiration light fastness; 22 alkaline perspiration lightfastness; 23—(for the blended fabrics in FIGS. 3-6) a sample of fabric color after cotton has been removed (typically by "burning" it out with sulfuric acid, $H_2SO_4$).

Table 3 is a combination of six sub-tables which provide test results for each of the six different fabrics illustrated in FIGS. 1 through 6. Thus, the first sub-portion gives the results for 101315A for a 20 hour lightfastness test (ISO 105-A05), then a 40 hour lightfastness test, then a 20 hour acid perspiration test, and then 20 hour alkaline perspiration test.

The second sub-portion of Table 3 corresponds to FIG. 2 (101315B); and thereafter FIG. 3 (101415); FIG. 4 (101515); FIG. 5 (101615); and FIG. 6 (102215).

In each case the dEF rating is calculated under ISO 105-A05. In general, ISO 105-A05 is an instrumental test for assessing the color change of a test specimen in comparison to the color change of a control specimen followed by a series of calculations that convert the instrument measurements into a grey scale rating.

The light fastness test is proprietary to the International Standards Organization, but publicly available (i.e. not confidential) on a subscription basis. In general, the color coordinates for lightness (L*), Croma (C*) and Hue $H_{AB}$ are measured for control and test specimens, and the differences are calculated and converted to the dEF grayscale rating by using equations that form part of the test protocol.

TABLE 4

140575 - Internal Parkdale Fastnes Results

| | 101615 | 101415 | 102215 | 101515 | 101315A | 101315B |
|---|---|---|---|---|---|---|
| 2A | | | | | | |
| CA | 4 | 3.5 | 4 | 4 | 3.5 | 4 |
| CO | 5 | 5 | 5 | 5 | 5 | 5 |
| PES | 4 | 3.5 | 4 | 4 | 3.5 | 4 |
| PA | 5 | 5 | 5 | 5 | 5 | 5 |
| PAC | 5 | 5 | 5 | 5 | 5 | 5 |
| WO | 5 | 5 | 5 | 5 | 5 | 5 |
| 3A | | | | | | |
| CA | 3 | 3 | 3 | 3 | 3 | 3 |
| CO | 4 | 4.5 | 4 | 4 | 4.5 | 4 |
| PES | 3 | 3 | 3 | 3 | 3 | 2.5 |
| PA | 4 | 4.5 | 4 | 4 | 4.5 | 4 |
| PAC | 4 | 4.5 | 4 | 4 | 4.5 | 4 |
| WO | 4 | 4.5 | 3.5 | 3.5 | 4.5 | 3.5 |
| Cold Water Bleed | | | | | | |
| CA | 5 | 5 | 5 | 5 | 5 | 5 |
| CO | 5 | 5 | 5 | 5 | 5 | 5 |
| PES | 5 | 5 | 5 | 5 | 5 | 5 |
| PA | 5 | 5 | 5 | 5 | 5 | 5 |
| PAC | 5 | 5 | 5 | 5 | 5 | 5 |
| WO | 5 | 5 | 5 | 5 | 5 | 5 |
| Acid Perspiration | | | | | | |
| CA | 5 | 5 | 5 | 5 | 5 | 5 |
| CO | 4 | 5 | 5 | 5 | 5 | 5 |
| PES | 5 | 5 | 5 | 5 | 5 | 5 |
| PA | 5 | 5 | 5 | 5 | 5 | 5 |
| PAC | 5 | 5 | 5 | 5 | 5 | 5 |
| WO | 5 | 5 | 5 | 5 | 5 | 5 |
| Alkaline Perspiration | | | | | | |
| CA | 5 | 5 | 5 | 5 | 5 | 5 |
| CO | 4.5 | 5 | 5 | 5 | 5 | 5 |
| PES | 5 | 5 | 5 | 5 | 5 | 5 |
| PA | 5 | 5 | 5 | 5 | 5 | 5 |
| PAC | 5 | 5 | 5 | 5 | 5 | 5 |
| WO | 5 | 5 | 5 | 5 | 5 | 5 |

Table 4 summarizes similar results for five types of tests: 2A wash fastness (AATCC 61 CAN/CGSB & ISO 105-C06 Test No BIM), 3A wash fastness (AATCC 61 CAN/CGSB & ISO 105-C06 Test No BIM), cold water bleed (steeping the fabric for a defined interval in water at 25° C.), acid perspiration fastness: (ISO 105-E04), and alkaline perspiration fastness (ISO 105-E04).

The sample fabrics (corresponding to FIGS. 1-6) are listed as a header row for each of the five sub-tables, as against a column that represents cellulose acetate (CA), cotton (CO), polyester (PES), nylon (PA), acrylic (PAC), and wool (WO). These are the fabrics in the strips in the corresponding portions of the photographs of FIGS. 1-6. The results indicate the potential color stability of the fabric when a fabric is formed of a blend of the invention and any one or more of these other types of fibers.

In the same way that the photographs illustrate excellent results with respect to (fabrics), the comparison testing of Table 4 confirms the results. The values are those obtained from ISO-C06.

Other tests used or useable to identify and compare the properties of the invention include one or more of the following.

AATCC 61 is a test developed by the American Association of Textile Chemists and Colorists (Research Triangle Park North Carolina USA). The details of the test are available from the association at AATCC.org/test/methods/test-method-61/; accessed Mar. 3, 2016.

The test evaluates the colorfastness with respect to laundering of textiles that are expected to withstand frequent laundering. Specimens are tested "under appropriate conditions of temperature, detergent solution, bleaching and abrasive action such that the color change is similar to that occurring in five hand or home launderings.

The shrinkage test is AATCC 135. Again this is proprietary in its details, but generally consists of marking a sample section of the fabric at selected measured distances, laundering the fabric in a predetermined manner, including drying, and then re-measuring the position of the marks to determine the amount of shrinkage.

Crocking (AATCC 8) is used to determine the amount of color that transfers from one sample fabric to another fabric by rubbing. The sample fabric to be tested is fastened to a crock meter and then rubbed against a white test cloth. The test is carried out both with a dry test cloth and then a wet test cloth. The amount of color transferred to the test cloth is assessed by comparison with the AATCC chromatic transference scale. The details of the test are proprietary to AATCC, but are publicly available and well understood by the skilled person.

The fabrics were also tested under AATCC skewing (skew, skewness) test method 179 which again is proprietary to AATCC, but publicly available and well understood in the art. The test determines the change in skewness in woven and knitted fabrics, or twisting garments when subjected to testing that mimics repeated automatic laundering procedures commonly used in home laundering. The test defines particular washing and drying procedures for obtaining the measured results. To some extent skewness testing gives an indication of the degree to which the yarns or courses in a fabric will be distorted from their intended and manufacture design.

Colorfastness with respect to commercial and domestic hot laundering can also be determined using ISO test number 105-C06. The exact test apparatus, materials and reagents and procedures are proprietary to the International Standards Organization (web address), but again are publicly available (subscription or individual purchase cost) and well understood by the skilled person.

Related tests deal with perspiration fastness (ISO 105-E04) water fastness (ISO 105-E01); and light fastness (ISO 105-B02).

In general, perspiration testing is carried out using two standard solutions that mimic perspiration, but with one being slightly acidic (e.g., pH 5.5) and one being slightly basic (e.g. pH 8.0).

A sample of a fabric to be tested is placed in immediate contact (often by sewing them together) with an undyed fabric that is otherwise identical. This composite sample is then soaked in the acidic or basic solution for about 30 minutes, and then maintained at an elevated temperature (for example 35-39° C.) under a slight pressure for about four hours.

The complementary tests (acid or base) are carried out in exactly the same manner. The composite samples can then be separated from the white cloth and dried, and the change in color of the specimen and the staining of the white cloth can be compared against a standardize gray scale.

Figure 8:
FIG. 8 shows a comparison of control fabrics and fabrics made from the invention using a different levelling agent than the sample in FIGS. 1-6.

FIG. 8 illustrates results from a subgroup of tests carried out on fabrics (control and invention) dyed using leveling agents different from those selected for the samples in FIGS. 1-6.

In FIG. 8, six different fabrics are illustrated (and numbered) along the top row: Dacron dyed using 1% Univadine DLS (25); the invention dyed using 1% Univadine DLS (26); Dacron dyed in 1% Univadine DFM (27); the invention dyed in 1% Univadine DFM (30); Dacron dyed in 10% Univadine DFM (31); and the invention dyed in 10% Univadine DFM (32). The Univadine leveling agents are available from Huntsman Textile Effects 3400 Westinghouse Boulevard Charlotte, NC 28273 USA The middle row shows dye residue results based on six undyed Dacron samples each of which was placed in the dye bath after the dying step. To the extent that the original fabrics (25-27 and 30-32) failed to uptake dye efficiently, the results are indicated in the second row. On this basis, less colored results are better than the results with faint (or even predominant) color.

Accordingly these show the residual dye uptake with the corresponding relationships: 25 and 33; 26 and 34; 27 and 35; 30 and 36; 31 and 37; and 32 and 40.

Test sheets 33, 35 and 37 all show evident color indicating that residual dye remained after Dacron samples 25 27 and 31 were dyed. Test sheets 34, 36 and 40 are essentially white, indicating a much more successful dye uptake by the inventive fabric samples 26, 30 and 32 respectively.

The bottom row of FIG. 8 shows light fastness test results made on the same fabrics for the same comparative purposes. In this row, the relationships are In each case, the fabric formed from the inventive composition gives superior results to the Dacron standard.

In the specification there has been set forth a preferred embodiment of the invention, and although specific terms have been employed, they are used in a generic and descriptive sense only and not for purposes of limitation, the scope of the invention being defined in the claims.

The invention claimed is:

1. A filament comprising:
 a polyester copolymer comprising about 4.5 and 5.5 percent adipic acid based on the total amount of polyester copolymer,
 between about 630 and 770 parts per million (ppm) of pentaerythritol based on the total amount of polyester copolymer,
 between about 3.4 and 4.2 percent polyethylene glycol based on the total amount of polyester copolymer, and
 an amount of diethylene glycol that is less than 2 percent based on the total amount of polyester copolymer.

2. A textured filament made from the filament of claim 1.

3. A fabric formed from the yarn of claim 1 and selected from the group consisting of woven fabrics and knitted fabrics.

4. A textured filament according to claim 2 that receives and retains reactive dye at atmospheric pressure and at temperatures below 212° F. (100° C.).

5. Staple fibers cut from the textured filament of claim 2.

6. A blend of cotton fibers and the staple fibers of claim 5.

7. A blended yarn comprising:
between about 20 percent and 80 percent by weight cotton; and
textured polyester copolymer staple fibers comprising:
a polyester copolymer comprising
between about 4.5 and 5.5 percent adipic acid based on the total amount of polyester copolymer,
between about 630 and 770 parts per million (ppm) of pentaerythritol based on the total amount of polyester copolymer,
between about 3.4 and 4.2 percent polyethylene glycol based on the total amount of polyester copolymer, and
an amount of diethylene glycol that is less than 2 percent based on the total amount of polyester copolymer.

8. A colorfast yarn according to claim 7 further comprising a reactive dye.

9. A fabric formed from the yarn of claim 7.

10. A fabric according to claim 9 selected from the group consisting of woven fabrics and knitted fabrics.

11. A fabric formed from the colorfast yarn of claim 8.

12. A fabric according to claim 11 selected from the group consisting of woven fabrics and knitted fabrics.

13. A garment formed from the blended yarn of claim 7.

14. A dyed fabric that consists essentially of:
a blended yarn composed of between about 20 percent and 80 percent by weight cotton;
with the remainder being textured polyester copolymer staple fibers comprising:
a polyester copolymer comprising
between about 4.5 and 5.5 percent adipic acid based on the total amount of polyester copolymer,
between about 630 and 770 parts per million (ppm) of pentaerythritol based on the total amount of polyester copolymer,
between about 3.4 and 4.2 percent polyethylene glycol based on the total amount of polyester copolymer, and
an amount of diethylene glycol that is less than 2 percent based on the total amount of polyester copolymer; and
a reactive dye.

15. A dyed fabric according to claim 14 selected from the group consisting of woven fabrics and knitted fabrics.

16. A garment formed from the dyed fabric of claim 14.

* * * * *